UNITED STATES PATENT OFFICE.

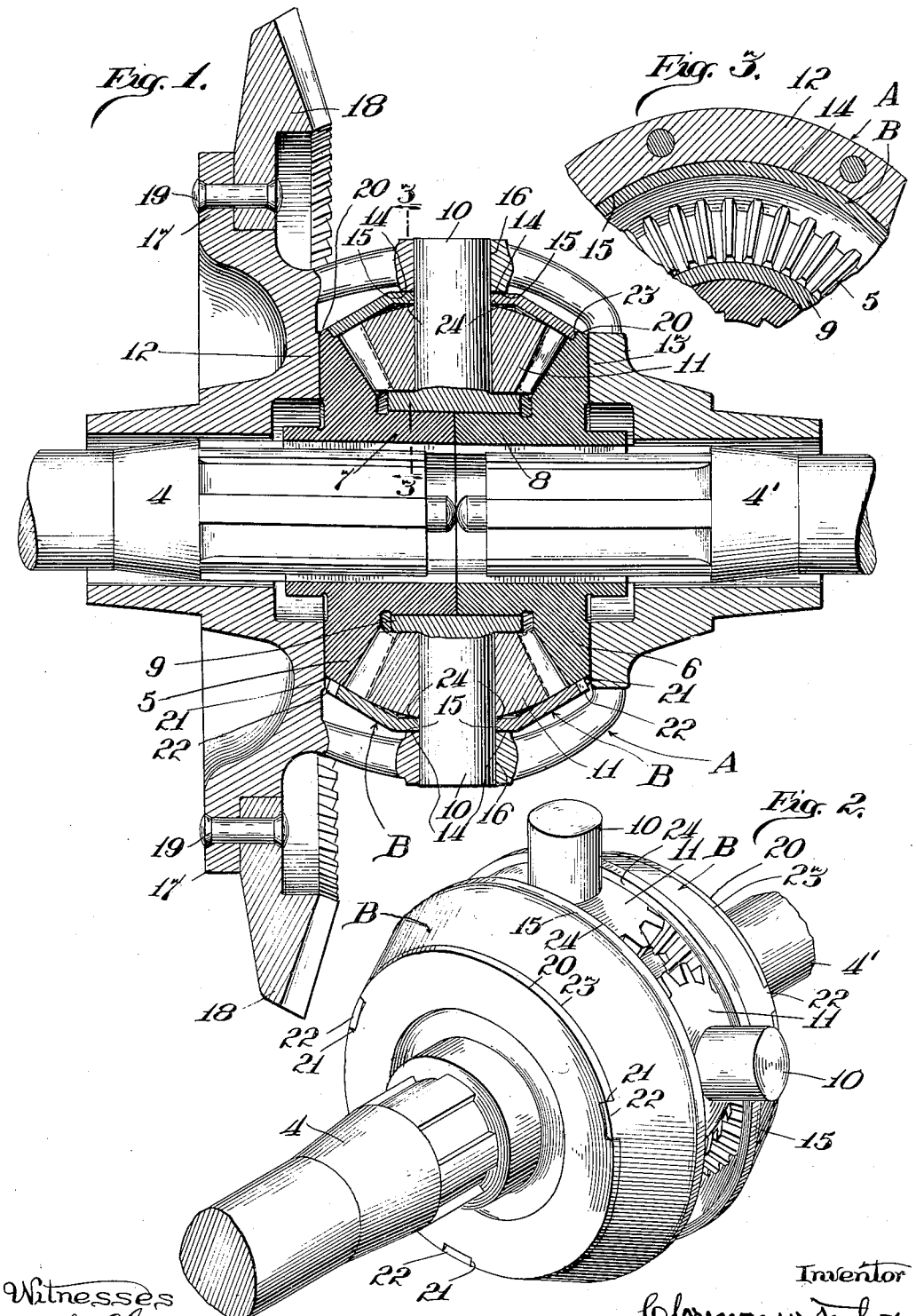

CLARENCE W. TAYLOR, OF CHICAGO, ILLINOIS, ASSIGNOR TO ONLAKE COMPANY, OF CHICAGO, ILLINOIS, A CORPORATION OF ILLINOIS.

BRAKE MECHANISM FOR DIFFERENTIALS.

1,324,856. Specification of Letters Patent. Patented Dec. 16, 1919.

Application filed August 12, 1918. Serial No. 249,398.

*To all whom it may concern:*

Be it known that I, CLARENCE W. TAYLOR, a citizen of the United States of America, residing at Chicago, in the county of Cook and State of Illinois, have invented certain new and useful Improvements in Brake Mechanism for Differentials, of which the following is a specification.

This invention relates to improvements in brake mechanism for differentials, more especially for automobiles, trucks and the like.

An object of the invention is to provide devices to prevent spinning of either road wheel and yet permit ample differentiation, particularly when employed with what is termed the bevel gear type of differentials, in an automobile, truck or the like.

This invention is an improvement in connection with the construction disclosed in my pending application filed November 20, 1916, Serial #132,259, and my pending application filed October 10, 1917, Serial #195,675, and my pending application Serial #221,669, filed March 11, 1918.

With the foregoing and other objects in view, my invention consists in the novel features and in the novel combination and arrangement of parts hereinafter fully described, illustrated in the accompanying drawings forming a part of this specification, and particularly pointed out in the claims hereunto appended; it being understood that changes, variations and modifications in the details of the invention within the scope of the claims may be resorted to without departing from or sacrificing any of the advantages thereof.

In the drawings,

Figure 1 is a longitudinal section of the rear axle of an automobile with my improvement incorporated therewith.

Fig. 2 is a perspective view of a differential with assembled brake-members detached from the rear axle.

Fig. 3 is a fragmentary section on line 3—3 on Fig. 1.

Similar numerals and letters refer to similar parts throughout the several views.

Referring to the drawings, the numerals 4 and 4' denote the adjacent ends of the usual divided shaft on which are fixed bevel gears 5 and 6 which have inwardly extending hubs 7 and 8. Positioned between said bevel gears is what is termed a spider 9 having radially projecting trunnions 10, which carry loosely mounted bevel pinions 11 which are constantly in mesh with both of said bevel gears. The rotatable housing A is composed of parts 12 and 13 which are secured together by bolts (not shown) or other suitable or preferred means, and each said part is formed with an internal annular face 14 for frictional contact with a portion of the outer surface 15 of brake member B hereinafter more fully described. The meeting edges of parts 12 and 13 have formed therein recesses 16 to receive the trunnions 10 in the usual or other desired manner. The part 12 is provided with an external annular flange 17 which has fixed thereto ring-gear 18 by rivets 19 which normally is constantly in mesh with the drive shaft pinion (not shown).

Preferably the periphery of each bevel gear 5 and 6 is formed with an outwardly extending annular flange 20 which is notched at 21 to receive a projection 22 on one edge of brake-member B, hereinafter further described, for establishing fixed relation between the bevel gear and the brake-member B.

The separate annular somewhat tapering brake-members B are alike in construction and a description of one is a description of both. The outer end 23 of each said brake-member B is in fixed relation to a bevel gear and the inner end 24 of each said brake-member B is in frictional relation with the power imparting means or rotatable housing A at 14 and with the trunnions 10 which are carried by the housing A. The brake-members being concentrically mounted with their inner ends in parallel relation to each other.

An important feature of the present invention is the simple means for establishing fixed relation between each of the gears 5 and 6 and the brake-members B, so that frictional resistance will be afforded only between the brake members and the power imparting means.

The extent of frictional resistance between the power imparting means and the brake-members to oppose the relative rotative movement of the bevel gears and the brake-members that are in fixed relation to said bevel gears will depend upon the frictional area the face 14 and the outer surface 15 of the brake-member B together with how tight the brake-members are put in place between the gears and trunnions 10.

It is desirable that the forces acting at the periphery of the vehicle or road wheels be greater when in operation than the frictional resistance between the brake-members and the power imparting means to the end that adequate differentiation be realized in operation of the automobile in a curved path.

I do not limit my present invention to the employment of two brake-members for the reason that one brake member in fixed relation to one gear and in frictional relation with the power imparting means is capable of effective work.

In construction, installation and operation, let it be remembered that the inner ends 24 of the brake-members B may be installed so tight between the inner annular face 14 of the parts of the housing A and the outer ends of the pinions 11 as to amount to a solid rear axle action and in effect prevent adequate differentiation even when turning a corner or when one drive wheel encounters an obstruction of considerable proportions on the road surface. Attention is called to this fact because it is preferable that the amount of friction exerted at the differential should not be much more than sufficient to successfully oppose relative rotative movement of the gear on the divided shaft when the vehicle is moving in a straight line or when one of the road wheels is off the road surface temporarily or is on a slippery or soft place and said wheel therefore has lost traction.

The principle of anchoring by friction means the gears on the inner ends of the divided shaft so as to overcome the driving torque and yet permit required differentiation caused by the forces acting at the periphery of the vehicle wheels when such forces are greater than the brake effort exerted at the differential, is an important feature of my invention.

I do not limit my invention to the employment of the annular flange 20 of the gears herein shown as means for establishing fixed relation of a brake-member B with a bevel gear as this fixed relation may be accomplished by other means which will readily occur to skilled mechanics.

In view of the simple character of my invention and the well known construction of bevel gear type of differential herein shown, it is thought on reference to the drawings and the foregoing description the construction and operation will be readily understood by those skilled in this art.

By thus showing and specifically describing one embodiment of my invention I do not intend to restrict the range of equivalents not made necessary by the prior state of this art.

Having thus fully described my invention, what I claim as new, and desire to secure by Letters-Patent, is:

1. In brake mechanism for differentials, the combination with a plurality of gears and power imparting means disposed between the gears, of a plurality of brake-members each in fixed relation at one end with one of the bevel gears and in frictional relation at the other ends with the power imparting means.

2. In brake mechanism for differentials, the combination with differential gears fixed to the adjacent ends of a divided shaft, including power imparting means, of two brake members each fixed at one end with one of said gears and both brake-members being in frictional contact at the other ends with the power imparting means.

3. In brake-mechanism for differentials, the combination with gears fixed to the adjacent ends of a divided shaft and pinions in mesh with the gears and power imparting means in operative relation to the pinions, of two brake-members each fixed at one end to one of said gears and both of said brake-members being in frictional relation at the other end with said power imparting means.

4. In brake mechanism for differentials, the combination with differential gears fixed to the adjacent ends of a divided shaft, including power imparting means, of two annular brake-members concentrically mounted each brake-member being fixed at one end to one of said gears and both of said brake-members being in frictional relation at the other ends with said power imparting means.

5. In brake mechanism for differentials, the combination with a divided shaft and gears fixed to the adjacent ends of the divided shaft and power imparting means, of two brake-members each in fixed relation at one end with one of said bevel gears and both of said brake-members being in frictional relation at the other ends with the power imparting means to oppose relative rotative movement of said bevel gears.

6. In brake mechanism for differentials, the combination with a divided shaft and bevel gears fixed to the adjacent ends of the divided shaft and power imparting means including radial trunnions carrying rotatably mounted bevel pinions in mesh with both of said bevel gears, of two brake-members each in fixed relation at one end with one of the bevel gears and both of said brake members being in frictional relation at the other ends with the power imparting means.

7. In brake mechanism for differentials, the combination with a divided shaft and bevel gears fixed to the adjacent ends of the divided shaft and power imparting means carrying rotatably mounted bevel pinions in mesh with both of said bevel gears, of two brake-members concentrically mounted and each in fixed relation at one end with one of said bevel gears and both said brake-members being in frictional relation at the other ends with said power imparting means and the trunnions carried thereby.

8. In brake-mechanism for differentials, the combination with differential gears fixed to the adjacent ends of a divided shaft and a rotatable housing, of two annular brake members each formed at one end for fixed relation to one of said gears, both of said brake-members being formed and disposed at their other ends in frictional relation with the rotatable housing.

9. In brake-mechanism for differentials, the combination of a divided shaft, two gears having peripheral notches fixed to the adjacent ends of the divided shaft, power imparting means including radial trunnions carrying rotatably mounted pinions in mesh with both of said gears, two brake-members each having projections at one end disposed in said notches of one of said gears, both of said brake-members being in frictional relation at their other ends with the power imparting means.

10. In brake mechanism for differentials, the combination of a divided shaft, gears fixed to the adjacent ends of the divided shaft, a rotatable housing having internal annular friction faces and carrying radial trunnions having rotatably mounted thereon pinions in mesh with said gears, a brake member for and in fixed relation at one end with each said gear both of which said brake-members being in frictional relation at their other ends with the internal annular friction faces of the rotatable housing.

11. In brake mechanism for differentials, the combination of a divided shaft, gears fixed to the adjacent ends of the divided shaft, a rotatable housing having internal annular friction faces and carrying radial trunnions each having rotatably mounted thereon a pinion in mesh with said gears, a brake-member for and in fixed relation at one end with each said gears both of said brake members being in frictional relation at the other ends with said trunnions.

12. In brake-mechanism for differentials, the combination with a plurality of gears and power imparting means positioned between the gears, of a brake-member in fixed relation at one end with one of said gears and in frictional relation at the other end with the power imparting means.

In testimony whereof I affix my signature.

CLARENCE W. TAYLOR.